(12) United States Patent
Couvet

(10) Patent No.: US 11,181,378 B2
(45) Date of Patent: Nov. 23, 2021

(54) DEVICE FOR LOCATING MOVING OBJECTS OR PEOPLE IN A SPACE EQUIPPED WITH AT LEAST ONE INDUCTIVE SURFACE

(71) Applicant: THALES, Courbevoie (FR)

(72) Inventor: Serge Couvet, Lège-Cap-Ferret (FR)

(73) Assignee: THALES, Courbevoie (FR)

( * ) Notice: Subject to any disclaimer, the term of this patent is extended or adjusted under 35 U.S.C. 154(b) by 312 days.

(21) Appl. No.: 16/303,896

(22) PCT Filed: May 24, 2017

(86) PCT No.: PCT/EP2017/062601
§ 371 (c)(1),
(2) Date: Nov. 21, 2018

(87) PCT Pub. No.: WO2017/202948
PCT Pub. Date: Nov. 30, 2017

(65) Prior Publication Data
US 2020/0318972 A1    Oct. 8, 2020

(30) Foreign Application Priority Data
May 24, 2016   (FR) ..................................... 1600830

(51) Int. Cl.
*G01C 21/16*   (2006.01)
*G07C 9/28*    (2020.01)
(Continued)

(52) U.S. Cl.
CPC .......... *G01C 21/165* (2013.01); *A43B 3/0005* (2013.01); *G01C 21/206* (2013.01);
(Continued)

(58) Field of Classification Search
None
See application file for complete search history.

(56) References Cited

U.S. PATENT DOCUMENTS 3,950,696 A * 4/1976 Miller ...................... G01V 3/08
324/234
7,636,062 B2   12/2009 Ward et al.
(Continued)

FOREIGN PATENT DOCUMENTS

WO         01/53852 A1    7/2001
WO     2005/031383 A1    4/2005
(Continued)

*Primary Examiner* — John F Mortell
(74) *Attorney, Agent, or Firm* — BakerHostetler

(57) ABSTRACT

A device is provided for locating a moving object or person in a space partially equipped with inductive surfaces. The device comprises magnetic detection means configured to detect the presence of the object or of the person on or close to an inductive surface, measure a heading angle by way of two simultaneous measurement points and generate dated reference heading angle data for the object or for the person; inertial detection means configured to generate estimated angular speed and acceleration data for the object or for the person; and calculation means coupled to the magnetic and inertial detection means, configured to combine the dated reference heading angle data with the estimated data in order to generated corrected position and orientation data for the object or for the person in the space.

11 Claims, 9 Drawing Sheets

(51) Int. Cl.
*A43B 3/00* (2006.01)
*G01C 21/20* (2006.01)
*G06K 9/00* (2006.01)
*H04B 5/00* (2006.01)

(52) U.S. Cl.
CPC .......... *G06K 9/00335* (2013.01); *G07C 9/28* (2020.01); *H04B 5/0031* (2013.01); *H04B 5/0043* (2013.01)

(56) References Cited

U.S. PATENT DOCUMENTS

| | | | |
|---|---|---|---|
| 7,830,309 B2 | 11/2010 | Ward et al. | |
| 2008/0036592 A1* | 2/2008 | Barral | G01V 3/088 340/540 |
| 2008/0111545 A1* | 5/2008 | Crowley | G01V 3/101 324/234 |
| 2013/0338961 A1 | 12/2013 | Youssef et al. | |
| 2015/0233776 A1* | 8/2015 | Zhe | G01L 1/146 600/592 |
| 2020/0103546 A1* | 4/2020 | Monnier | G01V 3/10 |

FOREIGN PATENT DOCUMENTS

| | | |
|---|---|---|
| WO | 2008/101925 A1 | 8/2008 |
| WO | 2009/113948 A1 | 9/2009 |
| WO | 2016/042296 A2 | 3/2016 |

\* cited by examiner

DEVICE FOR LOCATING MOVING OBJECTS OR PEOPLE IN A SPACE EQUIPPED WITH AT LEAST ONE INDUCTIVE SURFACE

CROSS-REFERENCE TO RELATED APPLICATIONS

This application is a National Stage of International patent application PCT/EP2017/062601, filed on May 24, 2017, which claims priority to foreign French patent application No. FR 1600830, filed on May 24, 2016, the disclosures of which are incorporated by reference in their entirety.

FIELD OF THE INVENTION

The invention relates to the field of the location of moving objects or people, and in particular to that of such location indoors.

BACKGROUND

Locating objects or people moving inside a building poses various problems that are linked both to the environment itself (thermal, acoustic or visibility conditions, for example), but also to the object or the person (random or predefined movement, speed of movement, carrying an apparatus for example).

One particular case of indoor location is that of the movement of combatants in an urban environment, large numbers of whom may be located in buildings with very poor visibility (use of smoke bombs for example), and who have to be able to be located individually in real time and without resorting to infrared (IR) techniques. The military environment imposes specific and rigorous constraints on indoor location systems.

Thus, these systems have to be reliable and robust so as to allow a labeled measurement of the position and of the heading of each person, at a high sampling frequency (for example at 100 Hz) and to within a few centimeters, in order for example to cover cases of entry into a building using the well known technique called crawling.

Moreover, whether in training exercises or in actual operational mode, there may be a very large number of people to be located who may move over large areas, for example over surface areas of buildings of the order of 10 000 m² and more, and they may be involved in operations that have a variable duration of up to several days. Therefore, the location solutions that have to be fitted to each individual should have a low cost of acquisition, have sufficient power autonomy and be accurate enough to allow instantaneous response times in order to identify each person individually and without delay.

There are solutions for the indoor location of people or of objects, but these do not meet all of the abovementioned requirements.

There are solutions based on geolocation. One widespread application is that of the geolocation of customers in large retail areas, airports or railway stations. The drawback is that these systems are not highly accurate, nor do they have sampling performances that are compatible with military training. For example, solutions based on "Wi-Fi" technology make it possible to achieve an accuracy of 15 cm at best, but require the installation of a network of antennas, which are difficult to calibrate and to maintain. In addition, Wi-Fi is highly sensitive to the movements of magnetic bodies, such as a gun, in the field of measurements.

Solutions based on low-energy "Bluetooth 4.0" technology are dedicated more to locating shopping carts in large shopping areas. They have strict emission power stability standards but have a sampling frequency that is restricted to 40 Hz.

Solutions called "smart floors" have been studied, so as to be able to integrate piezoelectric sensors into a floor covering. The sectors targeted are essentially the domestic sector and the sports sector, for example in order to detect people falling, or for the purpose of fitting out sports pitches in halls for locating players, during large sporting events. Although these approaches should make it possible to determine the area where a person is located, there is no labeling associated with the location, and it is not possible to formally identify a person.

Lastly, solutions based on monocular or stereo cameras exist. Besides the cost of these approaches and the fact that there has to be a network connection and an electric power supply available on each sensor, the major drawbacks of these solutions are that they only work with lighting that is perfectly controlled for the monocular cameras, and that they do not work in complete darkness. Moreover, such systems are fragile and require complex calibration in general.

In the field of combat training, two major types of solution are known:

One known solution is based on a three-dimensional mesh of ultra-wideband (UWB) emitters. Patent application GB200416731 from Ubisense describes such a solution. One drawback of the UWB approach is a high investment and maintenance cost. In addition, the emitters are highly sensitive to electromagnetic reflections and filtering the positions is then complex, the calibration (exact position of the antennas) being very difficult in order to obtain results to within 15 cm, and it does not stay stable over time. Lastly, for complex building topologies, it proves necessary to densify the UWB beacons, because a user always has to be in direct sight of at least one beacon.

Another known solution is based on the use of mats having magnetic loops, which consists in installing floor-covering panels having a magnetic loop. An RFID system makes it possible to know on which square the labeled person is located. Patent application WO2009/113948 A1 from Nyfelt describes such a solution. Although it is operational, this system has the drawback of being highly burdensome.

There is thus the need for a solution that mitigates the various drawbacks of the prior art solutions for the indoor location and labeling of moving objects or people.

The present invention addresses this need.

SUMMARY OF THE INVENTION

One objective of the present invention is to propose a device for locating moving objects or people in an enclosed or semi-enclosed space.

The principle of the invention consists in integrating magnetic position detection means into a floor at predefined locations, and in equipping the object or the individual to be located with a device that combines magnetic detection with inertial detection. The interaction of the floor/object or floor/person magnetic means allows a general location measurement for an object or for a person, and then, by virtue of the inertial measurement device, an adjustment is made that allows a very accurate measurement of the position and of the heading of the object or of the person.

Advantageously, the device of the invention makes it possible to accurately locate any object or any person that is moving quickly.

Advantageously, the invention is inexpensive and easy to implement. Specifically, the magnetic measurement means are integrated into a predefined and limited number of areas of a floor, allowing minimizing the cost linked to a surface to be monitored, the cost of installing the magnetic means and the cost linked to moving furniture into areas that are already furnished.

Still advantageously, the device of the invention allows synchronized measurement of the capturing of the movement of a person and of the position of his paths. In addition, the device allows elevation measurements on the objects or the people to be located.

The device of the invention is the combination of an integrated architecture associated with algorithmic methods allowing solving the complex problem of fusing clocks specific to various sensors, and of fusing position, speed and attitude data between uniform and non-uniform temporal measurements. The device makes it possible to manage a large number of measurement points per surface area unit, and transfer dated data in real time to fixed servers with a sampling frequency greater than 50 Hz.

Another advantage of the device of the invention is that of having significant autonomy, allowing it to operate over several days without the need for battery recharging.

To this end, one subject of the invention is a device for locating a moving object or person in a space, said space being equipped with at least one inductive surface, the device comprising:

magnetic detection means configured to detect the presence of the object or of the person on or close to said at least one inductive surface, and configured to measure a heading angle by way of two simultaneous measurement points and to generate dated reference heading angle data for the object or for the person;

inertial detection means configured to generate estimated angular speed and acceleration data for the object or for the person; and calculation means coupled to the magnetic and inertial detection means, configured to combine the dated reference heading angle data with the estimated data in order to generate corrected position and orientation data for the object or for the person in said space.

In one embodiment, the calculation means comprise means for determining a drift of the estimated data and means for calculating, on the basis of the dated reference heading angle data, a correction to be applied to the position and orientation data.

In one embodiment, the means for determining a drift of the estimated data are activated when the object or the person is detected on or close to said at least one inductive surface.

In one embodiment, the magnetic detection means comprise two magnetic sensors configured simultaneously to measure a heading angle and generate reference heading angle data.

In one embodiment, the device additionally comprises communication means configured to transmit generated data to a remote server. The transmitted data are dated data and estimated data, and the calculation means are coupled to the remote server.

In one embodiment, the communication means are wireless radio communication means. In another embodiment, the communication means are inductive.

In one embodiment, the device additionally comprises autonomous power supply means.

In one embodiment, the inertial detection means are AHRS inertial sensors.

The invention also covers a shoe equipped with a device such as described.

BRIEF DESCRIPTION OF THE DRAWINGS

Various aspects and advantages of the invention will appear in support of the description of one preferred, but non limiting, mode of implementation of the invention, with reference to the figures below.

DETAILED DESCRIPTION

Generally speaking, the problem of the invention is that of locating people or objects located inside buildings or just outside. One particular environment is that of highly secure areas where the movement of people has to be monitored with accuracy in any type of atmosphere that is clear or liable to be opaque to light (smoke, fog). The invention aims to measure, dynamically and with accuracy to the millimeter or to the centimeter, the position and the orientation of one or more reference frames linked to the feet of a person, of an animal or of an object moving over a large enclosed walled area, an area for example of the order of 10 000 m$^2$.

The aim of the invention is thus to determine, in real time, the coordinates of the origins and the values of the orientations of reference frames that are linked to the feet of a person, paws of an animal, or base of an object. In addition, the invention allows reference frames that are measured to be identified. Advantageously, the invention may apply both to inert people/animals or objects and to people/animals or objects that are moving over a floor that is not necessarily flat and horizontal.

Figure 1:
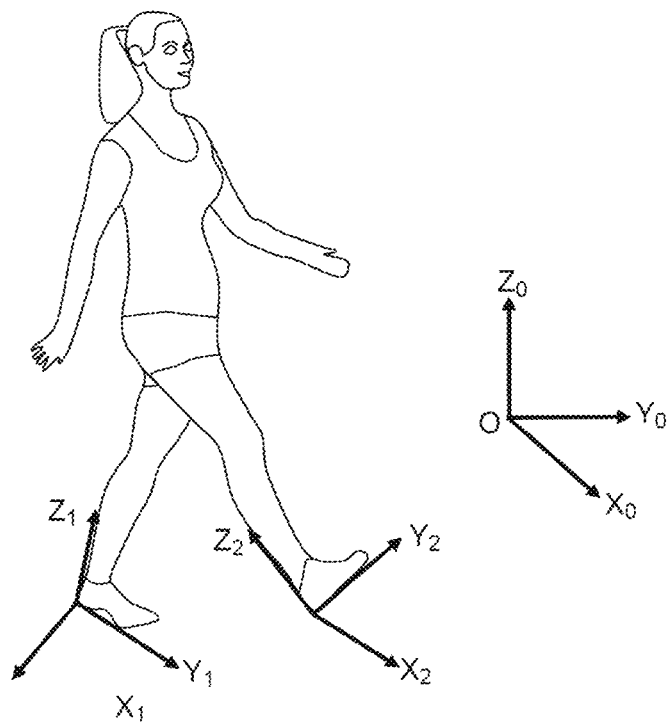
FIG. 1 illustrates linked reference frames of origin and orientation.
Figure 2:
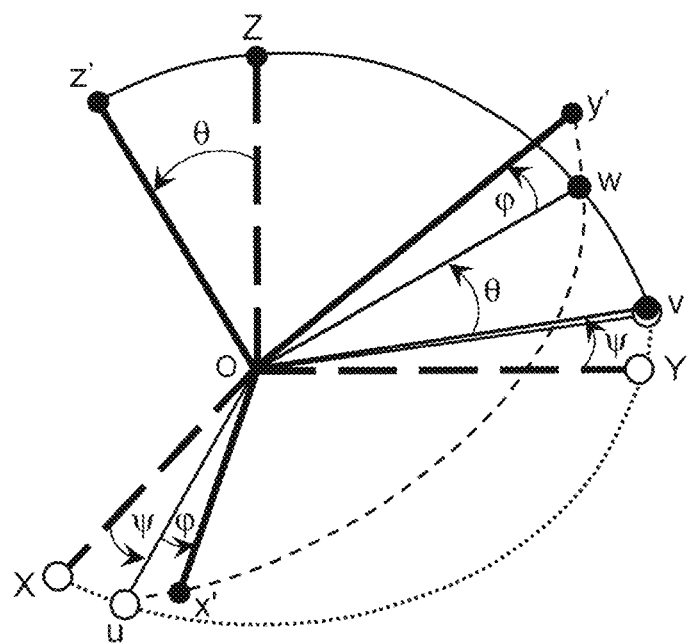
FIG. 2 is a general illustration of the Euler angles.

FIG. 1 illustrates reference frames of origin and orientation (X1, Y1, Z1) (X2, Y2, Z2) that are linked to the feet of a person who is moving. A linked reference frame is defined by the coordinates of an origin and Euler angles in the geographical reference frame (X0, Y0, Z0) linked to the floor. FIG. 2 is an illustration of the three Euler angles, commonly denoted $\varphi$, $\theta$ and $\psi$ and known for describing the orientation of a solid. A person skilled in the art will be able to refer to any work on solid mechanics for a broader description of the Euler angles and their rotation that serves to represent the orientation of a solid with respect to a reference frame, also called attitude.

Another known form for mathematically representing the orientation and the rotation of objects in three dimensions are quaternions. In one preferred embodiment, the invention uses quaternions to measure the orientation and rotation parameters and to calculate the realignments to be made to the measurements. A person skilled in the art will be able to refer to any work on complex number mathematics for a broader description of quaternions.

The device of the invention allows the measurement of the position of the origin of each linked reference frame with respect to the floor to be sampled at a frequency greater than 40 Hz, and for the estimations of the orientation of each moving reference frame to be performed at a frequency compatible with a high-quality movement reconstruction as a function of time. Preferably, the sampling frequency for the estimation of the orientation is performed at a frequency greater than that for the determination of the position, for example at a frequency of 100 Hz. In the remainder of the description, the use of the expression "linked reference frame" may apply to a reference frame linked to a person, an animal or an object.

Figure 3:
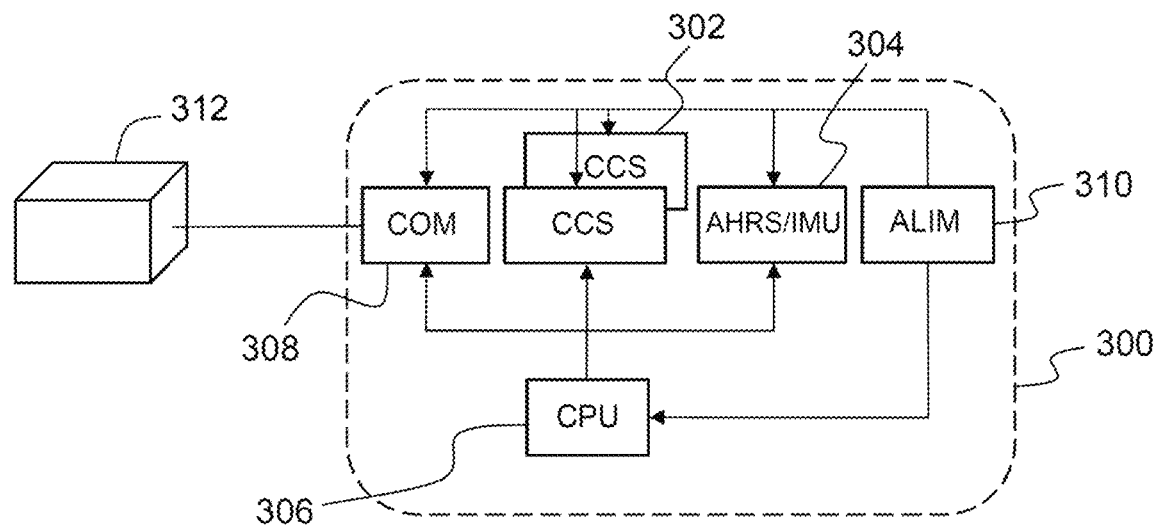
FIG. 3 schematically illustrates the architecture of the device of the invention in one embodiment.

FIG. 3 schematically illustrates the architecture of the device of the invention in one embodiment. The block (300) comprises a magnetic detection circuit (302) able to detect a magnetic field and perform position and speed measurements for a linked reference frame; an inertial detection circuit (304) able to supply angular speed and acceleration data for a linked reference frame; a calculation circuit (306) coupled to the magnetic and inertial detection circuits for performing calculations on the various data produced by the magnetic and inertial sensors, and formatting the data to be sent via a communication circuit (308). Advantageously, the device of the invention powers itself and has an autonomous power source (310). Thus, the circuit of the invention combines accurate local and asynchronous measurements from a magnetic measurement sensor with synchronous measurements derived over time supplied by an inertial sensor, so as to be able to extrapolate the position and the attitude of a linked reference frame when the magnetic measurement is lost due either to a height-based movement (beyond 0.1 m), to jumps, large strides or even dance movements.

In a more detailed manner, the magnetic detection circuit (302) comprises a kinematic floor sensor (CCS) that has, in one preferred embodiment, two measurement points (A, B) allowing a measurement in a floor reference frame with accuracy to the millimeter.

In one embodiment, the inertial detection circuit (304) is an inertial measurement unit (IMU) inertial sensor, as it is known in English, which comprises six sensors having meteorological accuracy:
three gyrometers measuring the three components of an angular speed vector (speed variations in the roll, pitch and yaw angles); and
three accelerometers measuring the three components of a specific force vector. The specific force is the sum of the external forces other than gravitational ones divided by mass.

The inertial unit (IMU) may also comprise a 3D magnetometer. It does not use any information external to the mover, and is able to integrate the movements of the mover (angular speed and acceleration) in order to estimate its orientation (roll, pitch and heading angles), its linear speed and its position. The position estimation relates to the starting point or to the last readjustment point. The circuit (IMU) generates raw data that are sent to the calculation circuit (306), which performs, in real time on the basis of the data received from the six sensors, the calculations for filtering and separating gravity and integrating the attitude angles (roll, pitch and heading), the speed vector and the position.

In one embodiment, the inertial detection circuit (304) is an "attitude and heading reference system" (AHRS) inertial unit, as it is known in English, which additionally comprises the same types of sensor as an IMU unit, an internal processor comprising code instructions for directly performing the operations of filtering the data from the sensors, of separating gravity and the specific acceleration of the mover, integrating the gyrometers in order to obtain the orientation angles of the inertial sensor and readjusting this orientation with gravity on two orientation axes (vertical and heading angle). Thus, the data supplied at the output of the AHRS sensor are the orientation angles and their derived values and/or the equivalent quaternions.

It should be noted that, in order for the angular readjustment of the pitch and roll angle to be as accurate as possible, the device of the invention should be immobile for a certain time, for example of the order of 30 ms during a phase of bearing on the floor, so that the direction of the gravity vector is able to be detected accurately by the inertial sensor. In one embodiment, the device is implemented in the heel of a shoe or of a boot. In the phase of bearing on the floor, walking imposes immobility in the floor reference frame, allowing the inertial sensor to measure the direction of the gravity vector. The gravity vector is then readjusted by analyzing the accelerations and the modulus of the gravity vector, thereby ensuring better determination of the roll and pitch angle.

Moreover, as the heading angle is derived over time, it has to be readjusted with respect to a reference heading value. In one preferred implementation, the measurement of the reference heading is carried out by way of two simultaneous position measurements performed at the time of a floor contact phase.

The communication circuit (308) comprises components known to those skilled in the art that make it possible to send data from the sensors and/or from the processor to a remote server (312). The data may be sent via a wireless radio link using any known technology and/or via an inductive link when the linked reference frame passes over inductive panels.

Figure 4A:
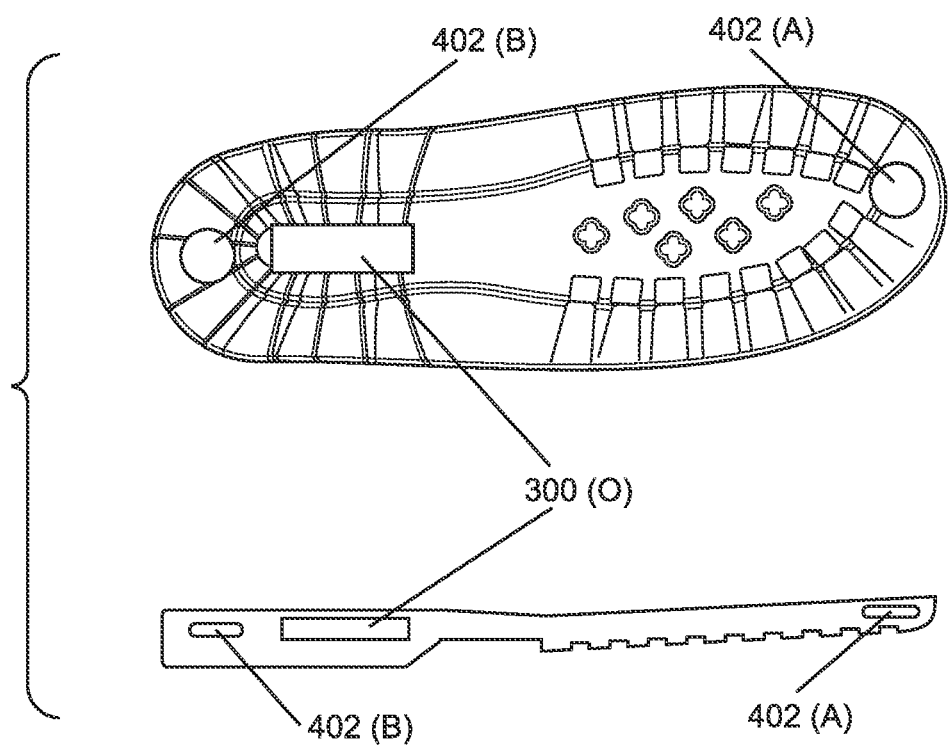
FIGS. 4a-4b show one exemplary implementation, in a sole of a shoe, of the device of the invention according to one embodiment.
Figure 4B:
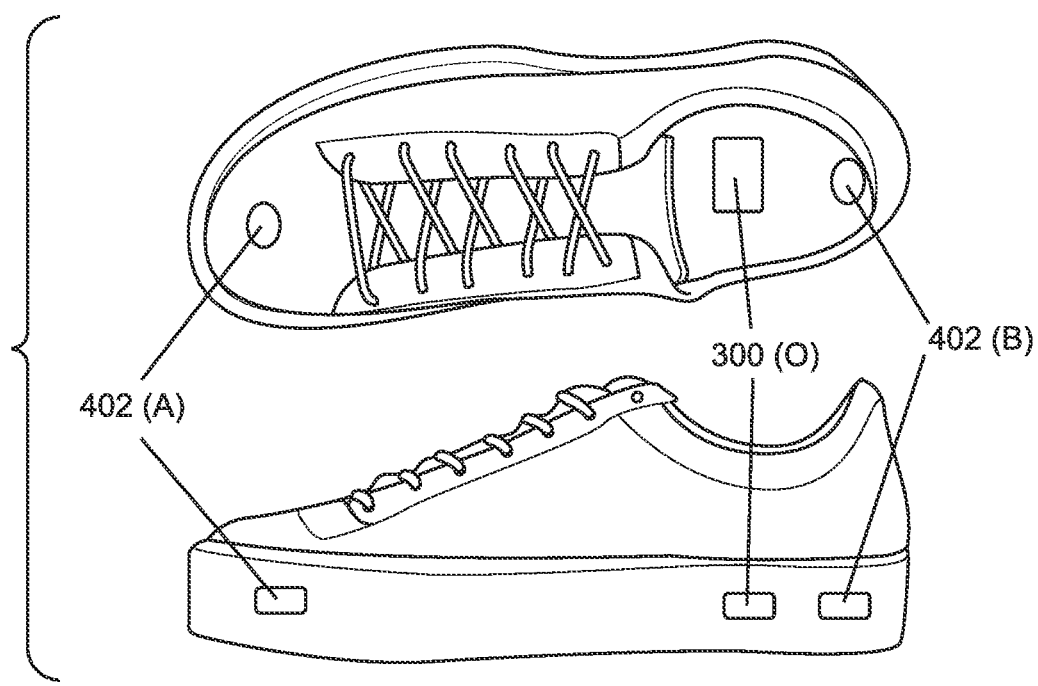

FIG. 4 illustrates one exemplary implementation of the device of the invention in a sole of a shoe. FIG. 4a shows a bottom profile view of the implementation of the device of the invention in the form of an integrated housing (300) comprising all of the components described with reference to FIG. 3 and positioned in the rear part of the sole. In the embodiment illustrated, two remote components (402(A), 402(B)) are integrated into the front part and the rear part of the sole, allowing two inductive measurement points (A, B) when the sole passes over or close to an inductive area of a floor. FIG. 4b illustrates a shoe equipped with a sole kitted out according to FIG. 4a, in which the housing (300) is situated in the heel area of the shoe. For measurement points (A, B) that are about thirty centimeters apart, which may correspond to the ends of a shoe, it is possible to measure a heading angle of the reference frame linked to the shoe to within 0.1 degree. A person skilled in the art understands that the example shown is nonlimiting, and that any variant may be contemplated with regard to the form of the sole, the shoe, and the location of the housing and of the measurement points. Thus, in one variant, not illustrated, the housing may be visible and positioned on the top of a shoe, and be kept in place by a self-adhesive attachment, for example. In another variant form, the housing may be carried by the person, the animal or the object without altering the operating principle of the invention.

Figure 5:
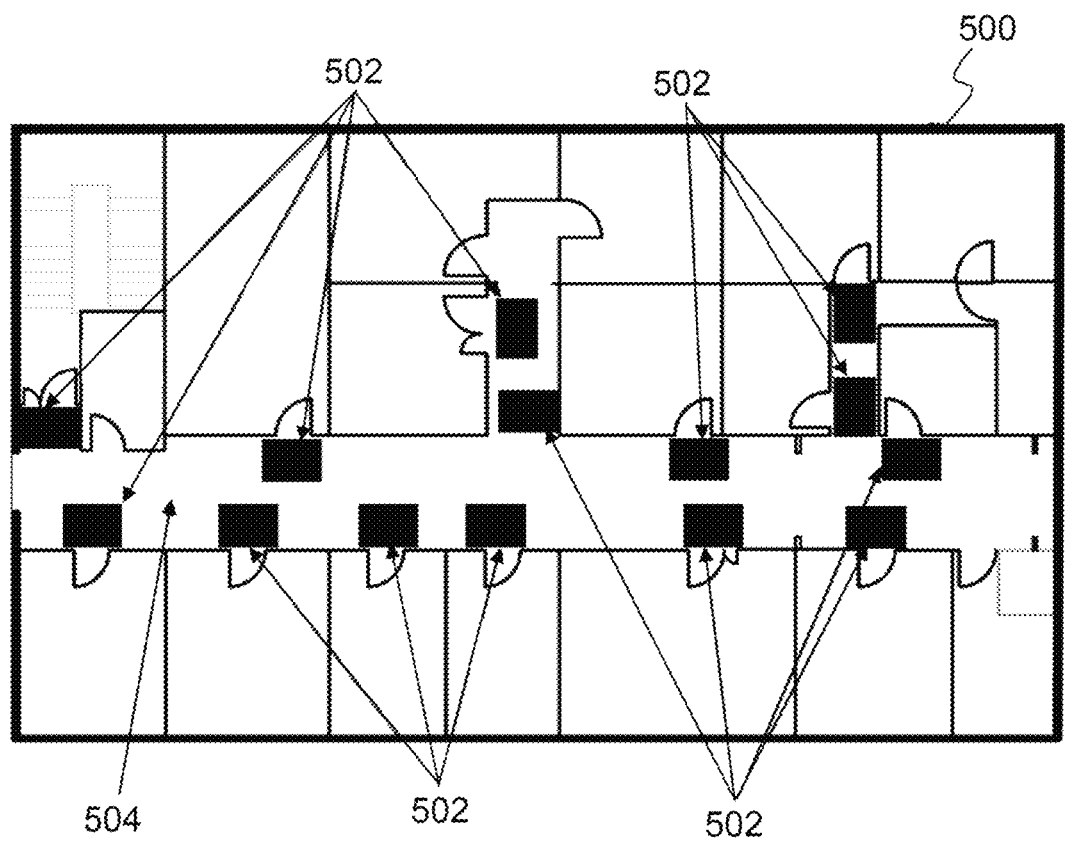
FIG. 5 schematically illustrates a building equipped with inductive surfaces according to the principles of the invention.

FIG. 5 schematically illustrates a building (500) equipped with a plurality of inductive surfaces allowing the method of the invention to be performed. In this example, the floor of a compound (504) where a linked reference frame has to be located is partially paved with inductive surfaces or coverings (502). The coverings may be joined together or separate. The location of the coverings is predefined by construction in the floor reference frame. As the position of the inductive coverings is known, the method of the invention makes it possible to measure the position and the orientation of a linked reference frame in a very accurate manner. Advantageously, to limit the cost of installation of a completely inductive floor, a limited number of inductive coverings are dispersed over the floor, positioned in a mosaic or positioned at strategic locations so as to ensure that a person inevitably walks over them when moving. During operation, a shoe coming into contact with the floor on an inductive covering (502) makes it possible to determine, using the CCS sensor (302), a millimetric position in the floor reference frame and a heading angle. This reference information is used to readjust the odometry calculations using the measurements from the inertial sensor (304) that are derived over time.

Figure 6:
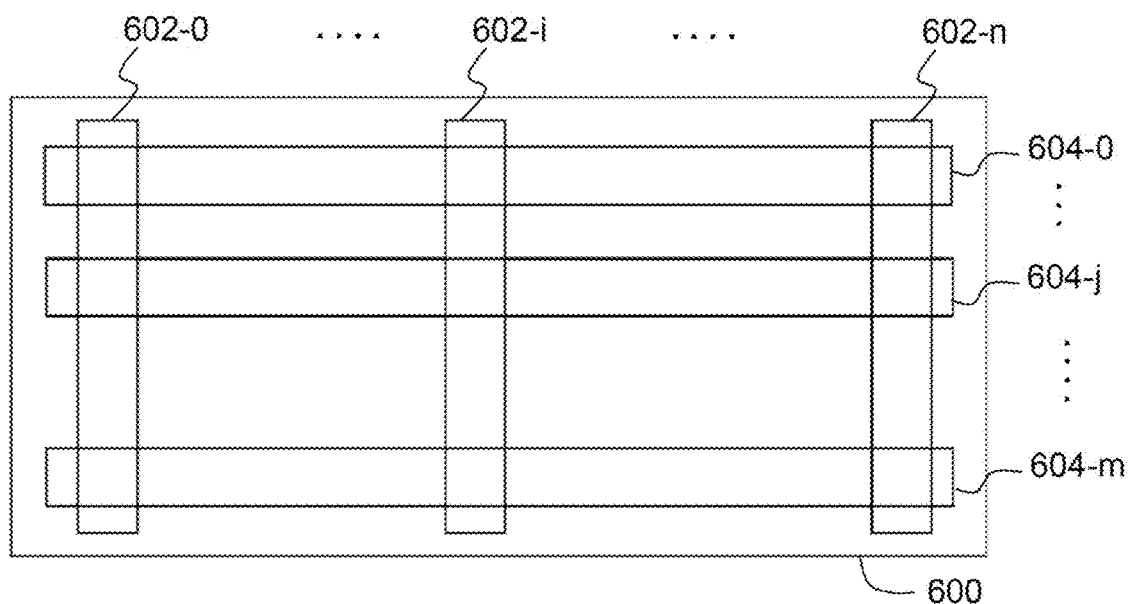
FIG. 6 illustrates one exemplary embodiment of an inductive surface.

FIG. 6 illustrates one exemplary embodiment of an inductive covering (600) for fitting out a floor for the purpose of performing the method of the invention. The size of the inductive coverings may vary depending on the site to be fitted out. Such a covering comprises a mesh of cable wires organized into columns (602-i) and into rows (604-j). The mat may be made from various materials: linoleums, resins, woods, to name just a few examples. The inductive coverings may or may not be flat. In the case of coverings that are not flat, the coordinates of the linked reference frame that will be measured are curvilinear coordinates that will be processed appropriately.

Figure 7A:
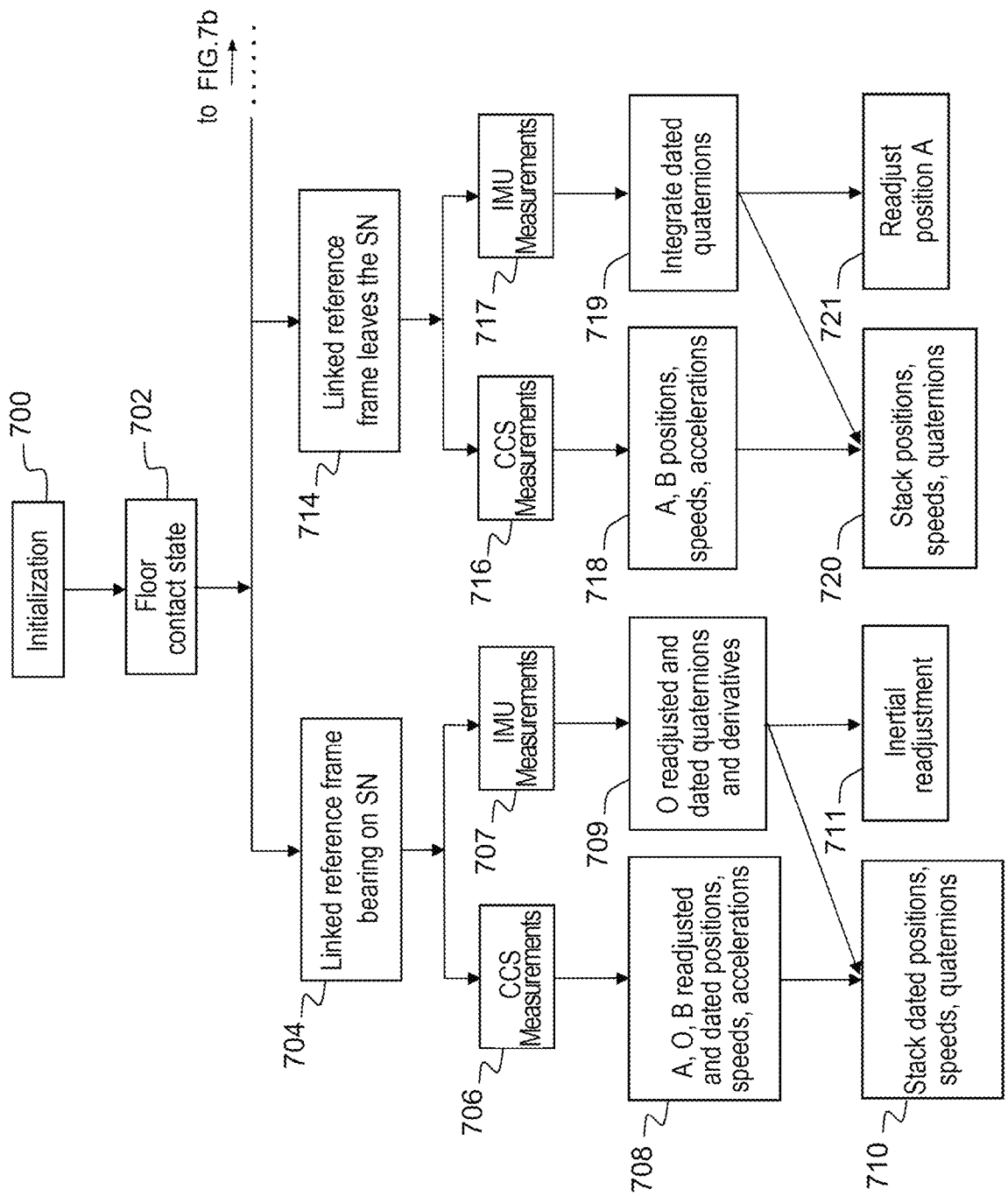
FIGS. 7a to 7c illustrate sequences of steps for locating an object or a person according to the principles of the invention.
Figure 7B:
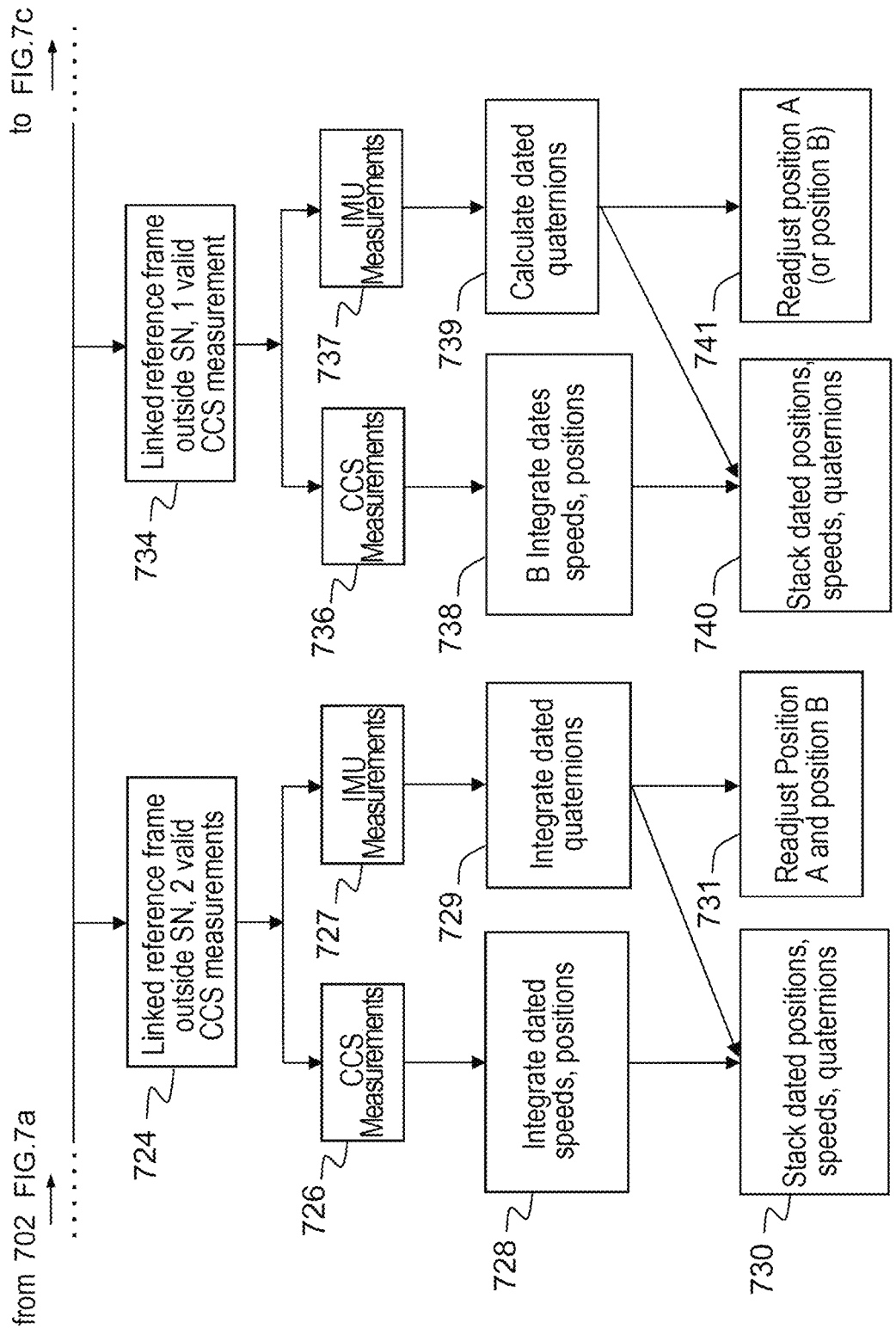
Figure 7C:
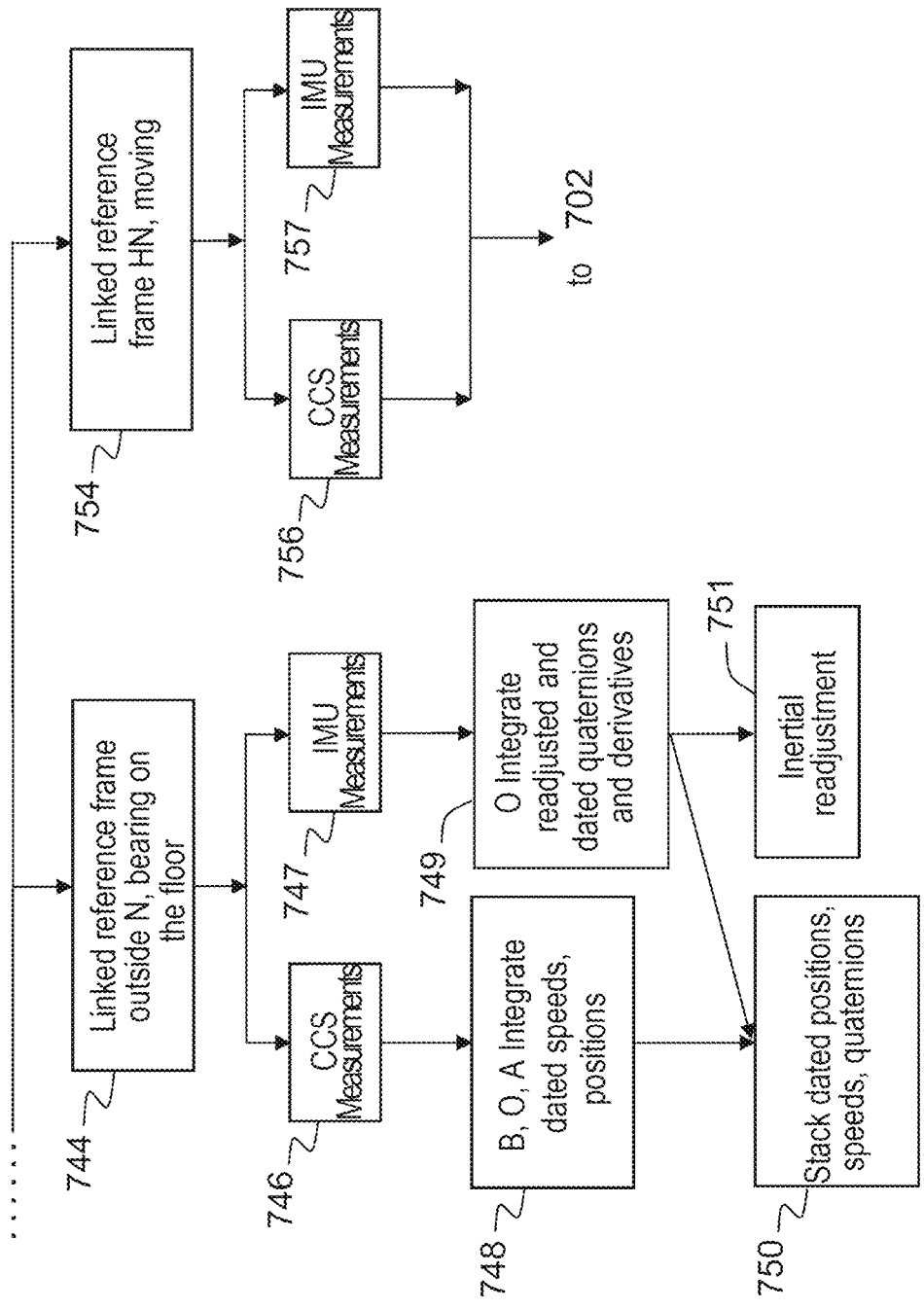
Figure 10:
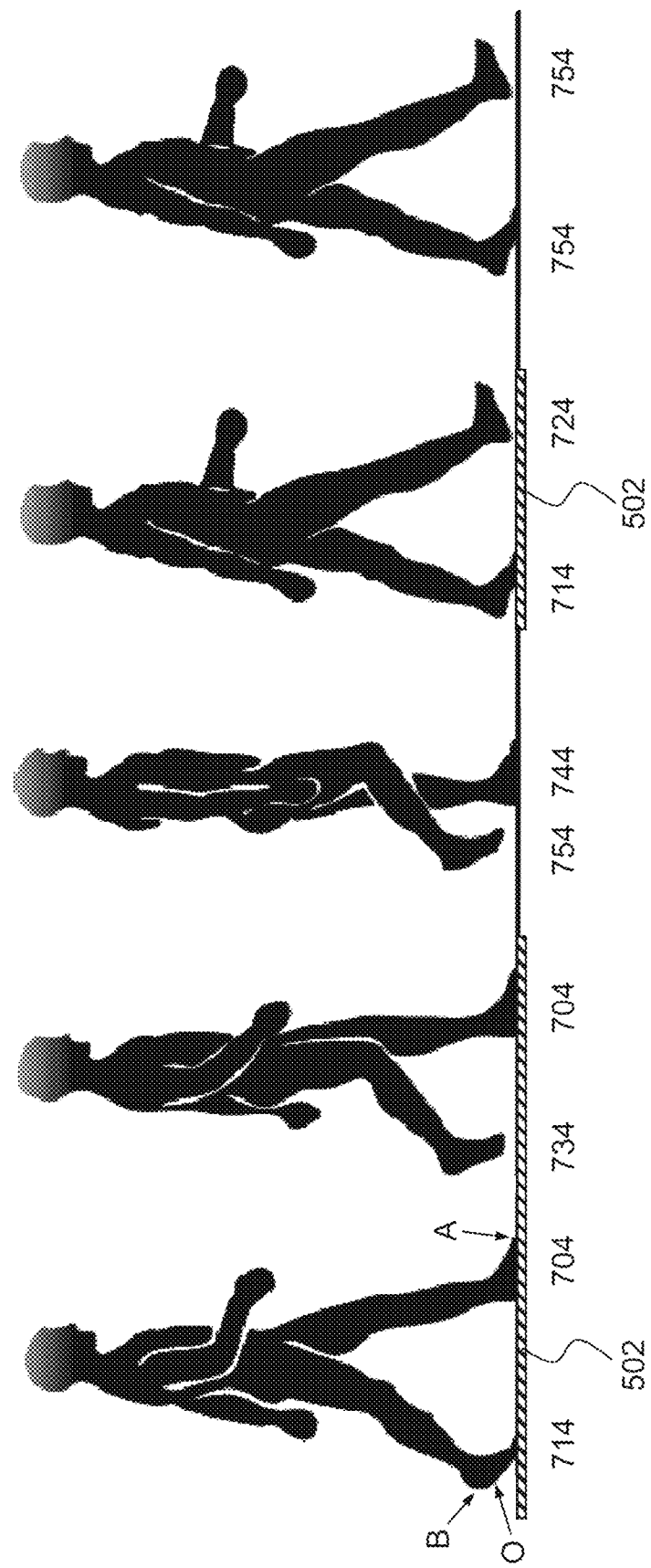
FIG. 10 illustrates various operating conditions for performing the location method of the invention.

FIGS. 7a to 7c illustrate the sequences of steps for locating an object or a person on the basis of the position of the linked reference frame fitted to the object or the person with respect to the floor. Specifically, the method of the invention makes it possible to determine according to whether the linked reference frame, which for the sake of clarity in the description is considered to be integrated into shoes, is in a bearing phase or an oscillating phase, on or above or outside an inductive covering. FIG. 10 illustrates the states of a two-footed walk, on the basis of which various steps according to FIGS. 7a to 7c are executed.

For the sake of simplicity, the method is described for a person wearing shoes each equipped with a device (300) having a linked reference frame (O) and two measurement points (A, B) and moving in a space in which inductive coverings (502) are positioned sparsely but whose position in geographical space is known.

When the person places at least one foot on an inductive surface for a first time, the system initializes (700) the inertial sensor (304) of the shoe in terms of attitude and in terms of position.

The method then makes it possible to determine (702) the proximity of the shoe to the surface of an inductive covering (502). In particular, the method makes it possible to distinguish between different states (FIG. 10) leading to the activation of various operating modes (FIGS. 7a to 7c) depending on whether:

Walking is performed on or above a floor with an inductive covering "SN" (704, 714, 724, 734), wherein:

at (704) points A and B are immobile and the foot is placed bearing on the floor covering SN;

at (714) point A is immobile with respect to the floor covering SN and point B is moving;

at (724) points A, O, B are above the floor covering SN but the measurements of points A and B are valid;

at (734) points A, O, B are above the floor covering SN but further from the floor, a single measurement of points A or B is valid.

Walking is performed on or above a floor without an inductive covering "HN" (744, 754), wherein:

at (744) points A and B are placed bearing on the floor HN;

at (754) points A, O, B are not touching the floor.

After step (704, 714, 724, 734, 744, 754) of determining the state of the reference frame with respect to the floor, the method enters into capturing measurements from the various CCS magnetic sensors (706, 716, 726, 736, 746, 756) and IMU inertial units (707, 717, 727, 737, 747, 757).

When the induction measurements (706, 716, 726, 736, 746) are validated, the positions (X, Y, Z) of points A and B are measured in the floor covering SN reference frame. The positions and their temporal derivatives in the reference frame of the floor (X, Y, Z) of points A and B and of the reference point O are then determined. The heading of the linked reference frame with respect to the floor is then known perfectly, for example with respect to the floor reference frame, with the value: $\psi = a\tan 2((X_A - X_B)/(Y_A - Y_B))$;

For the inertial measurements (707, 717, 727, 737, 747), advantageously an inertial unit exactly measures the gravitational acceleration $-\vec{g}$ and not $\vec{\Gamma} - \vec{g}$ as the foot is immobile with respect to the floor. The inertial unit supplies at least the measurements in the form of quaternions or of corrected-attitude Euler angles in the case of an AHRS inertial unit. In the case of an AHRS inertial unit, an internal microcomputer filters and corrects the measurements. An IMU inertial unit measures $\vec{\Gamma} - \vec{g}$ and it is possible to measure gravity in the reference frame of the inertial unit in order to find the accelerations of the reference frame linked to the shoe, which break down into specific linear accelerations and composition accelerations. In the case of an IMU, the calculations are carried out on a server. The method then makes it possible to date and correct the valid measurements.

Figure 8:
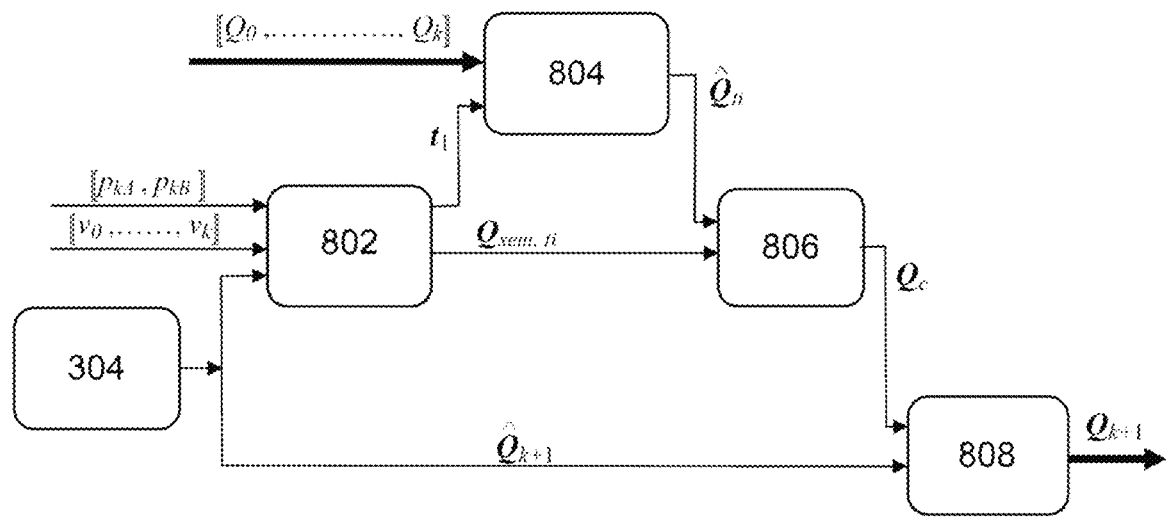
FIG. 8 illustrates the method for realigning the measurement of the orientation according to one embodiment of the invention.

FIG. 8 shows a diagram of the order of the steps for determining, at the time tk, and for dating the corrected measurements from the inertial sensor, corresponding to boxes (709, 719, 729, 739, 749).

The references in FIG. 8 are given at the end of the description.

After the step of the induction measurements, the method makes it possible (708, 718, 728, 738, 748, 748) to realign and to determine, at a time tk, the accelerations, speeds and positions. When an estimation of the inertial position is obtained at the time when the CCS measurement is performed, the position realignment process consists in calculating the difference between the two inductive and inertial position measurements at the time when the measurement on the floor covering SN was performed and in applying it as a correction for the present time. Advantageously, adding a biomechanical model to this operation makes it possible to reduce the noise of the raw measurement from the sensor, or even eliminate an isolated abnormal measurement.

Figure 9:
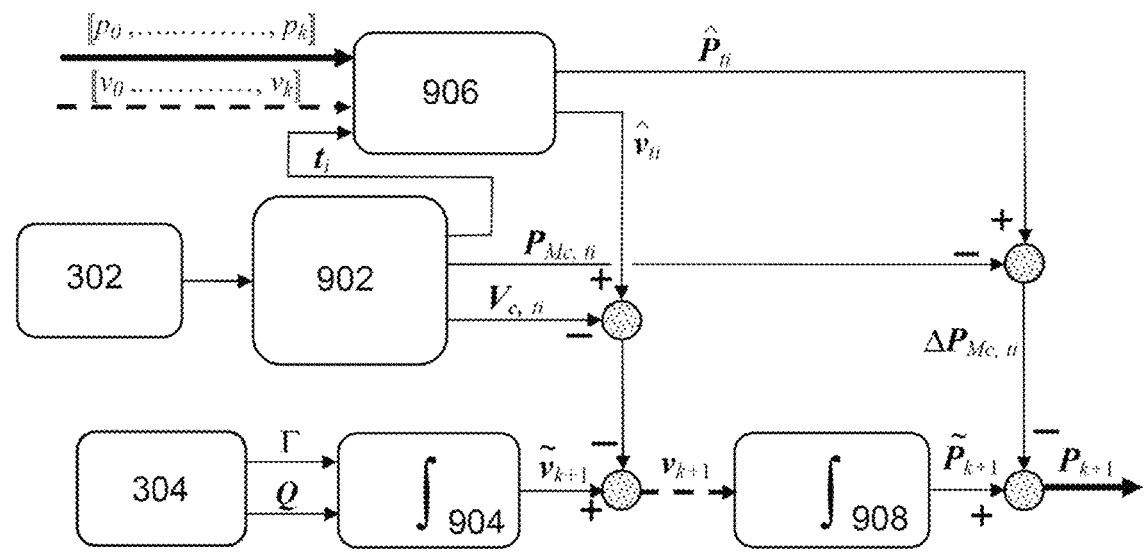
FIG. 9 illustrates the method for realigning the measurement of the position and of the speed according to one embodiment of the invention.

FIG. 9 shows a diagram of the order of the steps of determining, at the time tk, and of realigning the accelerations, speeds and positions of points A, O and B. Box (902) illustrates the calculation of the positions and of the speeds on the basis of the measurements from the CCS sensor (302), and box (906) illustrates the calculation of the estimation of the correction to be applied to the positions and speeds. The essential point of this process is to correct the speed given by the inertial sensor (304) after a first integration (904) and then to correct the position after the second integration (908).

The references in FIG. 9 are given at the end of the description.

After correcting the measurements, the data calculated and dated for the quaternions and the linear speeds and positions are stored (710, 720, 730, 740, 750) so as to form the log of measurements (positions, speeds, quaternions) and allow calculations by the modules (804) and (906) in the following cycle.

Blocks (711, 721, 731, 741, 751) represent the process of reacting to offsets in the inertial unit or in the constants of integration for the calculation of the speeds and position. The attitude angle, position and gravity data make it possible to "reinstantiate" the speed and position integration chains and the inertial unit (IMU or AHRS). For example, when the foot is placed so as to be immobile on the floor, the measured acceleration is exactly equal to g, the linear speeds are zero and the positions of points A and B are those measured by the CCS sensor, the attitude angles are constant: $\theta=\theta_0$; $\varphi=\varphi_0$.

Kalman filtering may be added depending on the quality obtained for the position measurements.

It should be noted that the sequence of the calculations (714 to 721) is virtually identical to that (704 to 711), the differences being that the inertial unit is not reinstantiated (attitude angles except from $\Psi$ and its temporal derivatives). Only the positions of A and B and their temporal derivatives are used to readjust the integration chain (718), and the position of reference point O of the linked reference frame is calculated on the basis of the data from the inertial unit.

For cases (724) where a shoe is close to the inductive covering but at a distance such that the position measurement becomes less effective due to a decrease in the magnetic field, the method makes it possible to take into account the data supplied by the inertial sensor in order to recalculate the trajectory of the reference point and the Euler angles of the linked reference frame. The sequence of the calculations (724 to 731) is virtually identical to that (714 to 721), except for the heading of the shoe, which is not calculated by the positions of A and B but by integrating the gyroscopic measurements from the inertial unit. Another possible embodiment is that of constructing a filter on the basis of two calculation methods: a) integrated IMU measurements and b) on the basis of the measurements of positions A and B by the CCS.

For cases (734) where a shoe is in the air but too far from the inductive surface to supply a single valid CCS measurement, the sequence of calculations (734 to 741) is virtually identical to that (724 to 731) but for just one measurement.

For cases (744) where the position of the shoe is such that, when it returns to being flat on the floor, it is outside an inductive surface, the method makes it possible to realign the position in terms of altitude (Z) and two attitude angles (the roll and the pitch), the position in (X,Y) in geographical space being derived as a function of the features of the accelerometers. The sequence of calculations (744 to 751) is virtually identical to that (704 to 711), except for the fact that it is not possible to readjust the positions. The attitude angles and their derivatives (except for $\Psi$) are zero, and the altitudes $Z_A$, $Z_B$, $Z_O$ are readjusted.

For cases (754) where no CCS measurement is available, the method continues to wait (702) for the detection of a new state in which a measurement becomes valid.

Thus, each time a person passes over an inductive covering, the inertial sensor is reset in terms of attitude and position. On the basis of the corrected information, the method makes it possible to reconstruct the trajectory taken by the moving person, animal or object.

Advantageously, according to various embodiments, the data from the sensors may be fused either in the processor (306) of the device of the invention and the result is sent to a remote server (312) in order to calculate the trajectory, or may be fused in a processor of a remote server (312) after sending of the raw data from the sensors.

Among other advantages, the device of the invention allows:
  tracking of a plurality of people to within a few centimeters in a building reference frame, and labeling of each person, regardless of the conditions in terms of opacity and clearness of the atmosphere;
  capturing of an accurate position, sampled at a frequency of 50 Hz;
  measurement of the position of the paths of a moving person or object or animal and capturing of synchronized movement;
  an operating range over a wide temperature range, ranging from −20° C. to +60° C.;
  significant operating autonomy, of the order of a week;
  use compatible with all of the requirements of live simulation in which infrared is not permitted, ineffective optical solutions in the case of smoky dust;
  operation on a horizontal floor and over areas that are not flat.

The present description illustrates one preferred implementation of the invention, but is nonlimiting. One example has been chosen so as to allow a good understanding of the principles of the invention, and one specific application, but it is in no way exhaustive, and should allow a person skilled in the art to provide modifications and implementation variants while keeping the same principles.

References for FIGS. 8 and 9:

| | |
|---|---|
| $[Q_0, \ldots, Q_k]$ | Log of the dated quaternions |
| $t_i$ | Time of the "floor contact" estimation |
| $Q_{sem, ti}$ | Estimation of the angles |
| $\hat{Q}_{ti}$ | Estimation of the quaternion linked to the reference trihedron of the sole at the time $t_i$ |
| $Q_c$ | Total correction to be applied in order to realign the trihedron with the last valid estimation of the "floor contact" |
| $\hat{Q}_{k+1}$ | Estimation of the orientation quaternion |
| $Q_{k+1}$ | Updating of the orientation of the reference reference frame after angular realignment |
| $[p_0, \ldots, p_k]$ | Log of the SN positions |
| $[v_0, \ldots, v_k]$ | Log of the SN speeds |
| $t_i$ | Time at which the measurement was performed in the time base of the SN |
| $P_{Mc, ti}$ | Measurement of the SN position in the SN time base |

| | |
|---|---|
| $\tilde{P}_{k+1}$ | Estimation of the position supplied by the inertial sensor after correction of the speed integrations |
| $P_{k+1}$ | Updating of the position of the CO in the floor reference frame after AHRS realignment and SN measurements |
| $\Delta P_{Mc,\, ti}$ | Correction to be applied in order to realign the position given by the inertial unit with the last SN measurement |

The invention claimed is:

1. A device for locating a moving object or person in a space, said space being equipped with at least one inductive surface, the device comprising:
   magnetic detection means configured to detect the presence of the object or of the person on or close to said at least one inductive surface, and configured to measure a heading angle by way of two simultaneous measurement points and to generate dated reference heading angle data for the object or for the person;
   inertial detection means configured to generate estimated angular speed and acceleration data for the object or for the person; and
   calculation means coupled to the magnetic and inertial detection means, configured to combine the dated reference heading angle data with the estimated data in order to generate corrected position and orientation data for the object or for the person in said space.

2. The device as claimed in claim 1, wherein the calculation means comprise means for determining a drift of the estimated data and means for calculating, on the basis of the dated reference heading angle data, a correction to be applied to the position and orientation data.

3. The device as claimed in claim 2, wherein the means for determining a drift of the estimated data are activated when the object or the person is detected on or close to said at least one inductive surface.

4. The device as claimed in claim 1, wherein the magnetic detection means comprise two magnetic sensors able simultaneously to measure a heading angle and generate reference heading angle data.

5. The device as claimed in claim 1, additionally comprising communication means configured to transmit generated data to a remote server.

6. The device as claimed in claim 5, wherein the transmitted data are dated data and estimated data, and wherein the calculation means are coupled to the remote server.

7. The device as claimed in claim 5, wherein the communication means are wireless radio communication means.

8. The device as claimed in claim 5, wherein the communication means are inductive communication means.

9. The device as claimed in claim 1, further comprising autonomous power supply means.

10. The device as claimed in claim 1, wherein the inertial detection means are AHRS inertial sensors.

11. A shoe integrating a device as claimed in claim 1.

* * * * *